Patented Nov. 21, 1944

2,363,465

UNITED STATES PATENT OFFICE 2,363,465

N-SUBSTITUTED AMINO ALCOHOLS AND PROCESS OF MAKING SAME

Murray Senkus, Terre Haute, Ind., assignor to Commercial Solvents Corporation, Terre Haute, Ind., a corporation of Maryland No Drawing. Application May 7, 1942, Serial No. 442,082

7 Claims. (Cl. 260—570.6)

My invention relates to a new class of chemical compounds, and to a process of preparing such compounds.

The chief object of the invention is the production of these chemical compounds or reaction mixtures comprising hydrolyzed reactions products containing such novel chemical compounds.

I have discovered that reaction products of 1-aza-3,7-dioxabicyclo(3.3.0)octanes or oxazolidines with Grignard reagents upon hydrolysis yield N-substituted amino alcohols. Although the course of the reaction is not definitely known, it is believed to proceed according to the following equations:

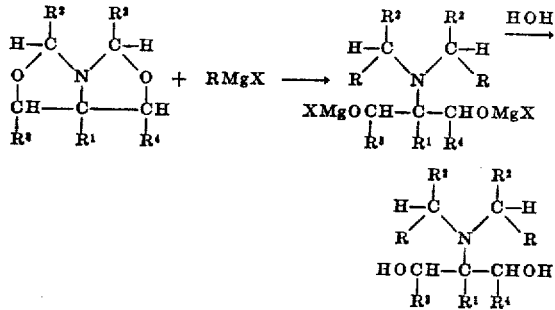

wherein R is alkyl, aryl, aralkyl, or heterocyclic, $R^1$ is hydrogen, alkyl, or alpha-hydroxyalkyl, $R^2$ is hydrogen, alkyl, aryl, aralkyl, or heterocyclic, $R^3$ and $R^4$ are hydrogen, alkyl, aryl, aralkyl, or heterocyclic, and X represents a halogen. And,

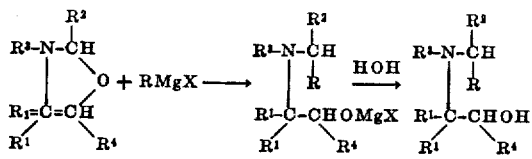

wherein R may represent alkyl, aryl, aralkyl, or heterocyclic; each $R^1$ may represent hydrogen, alkyl, or alpha-hydroxy alkyl; and $R^2$ represents hydrogen, alkyl, aryl, aralkyl, or heterocyclic, and $R^3$ and $R^4$ each may be hydrogen, alkyl, aralkyl, or heterocyclic; but at least one of said $R^2$ and $R^3$ is heavier than hydrogen, and X represents a halogen.

It is to be noted that when the substituent $R^1$ in both reactions represents an alpha-hydroxyalkyl group, the Grignard reagent will attack this group, but on hydrolysis it is converted back to the alpha-hydroxyalkyl group. Thus, for example, more specifically, I have found that when one of the oxazolidines, or 1-aza-3,7-dioxabicyclo (3.3.0)octanes, is reacted with a Grignard reagent, and the resulting reaction product hydrolyzed, a substituted amino alcohol is formed. In the event that the oxazolidine, utilized in the reaction, is an hydroxyalkyl oxazolidine, the resulting product will be a polyhydric alcohol. Also, in the event that the oxazolidine is a 4,4-disubstituted oxazolidine, the resulting product will be a disubstituted amino alcohol. In any event, the reaction is readily effected and the desired resulting product may be easily obtained by selecting the appropriate oxazolidine or 1-aza-3,7-dioxabicyclo(3.3.0)octane, and the desired Grignard reagent, and hydrolyzing the resulting reaction product effected between the two.

In the reactions wherein a Grignard reagent is reacted with the desired 1-aza-3,7-dioxabicyclo(3.3.0)octane, and the reaction product hydrolyzed, the resulting product is a polyhydric alcohol. Broadly speaking, the two fused rings of the 1-aza-3,7-dioxabicyclo(3.3.0)octanes are both of the oxazolidine type. For example, the compounds utilized as starting materials in the process of my invention and which contain only one oxazolidine ring are prepared by reacting equimolecular quantities of an amino monohydric or dihydric alcohol and the desired aldehyde, thereby liberating one mole of water per mole of alcohol. The 1-aza-3,7-dioxabicyclo-(3.3.0)octanes, however, which contain two oxazolidine rings are prepared by reacting one mole of amino polyhydric alcohol with two molecular quantities of the desired aldehyde, thereby liberating two moles of water per mole of alcohol. This reaction in general is most advantageously effected by merely heating the reaction mixture to distillation temperature and distilling off the water formed during the condensation. The application of heat is continued until substantially no additional water is observed to come over into the distillate. The crude 1-aza-3,7-dioxabicyclo(3.3.0)octane thus obtained and which constitutes the major portion of the still residue may be further refined by distillation or recrystallization or a combination thereof. This procedure is described in further detail in my copending application U. S. Serial No. 441,021, filed April 29, 1942.

The products may, in general, be prepared by reacting the desired oxazolidine or 1-aza-3,7-dioxabicyclo(3.3.0)octane with a suitable Grignard reagent, in the liquid phase, followed by hydrolysis. It is desirable to make a solution, preferably with ethyl ether, of the reactants and mix the two solutions to form the reaction mixture. The products which are solids at ordinary temperatures are preferably separated from the reaction mixture by extraction with a suitable solvent, such as benzene, whereas the products which are liquids at ordinary temperatures are recovered from the reaction mixture by distillation at reduced pressure.

The molar ratio of Grignard reagent to the oxazolidine or 1-aza-3,7-dioxabicyclo(3.3.0) octane will vary, naturally, according to the oxygen content of the compound. There should be at least one mole of Grignard reagent for each oxygen atom of the other reactant, and preferably there should be a slight excess of the Grignard reagent.

For the benefit of those skilled in the art, I give herein a number of representative examples which are by no means exhaustive, but which I deem sufficient to teach those skilled in the art the manner in which my invention may be practiced:

Example I

A solution of 82 parts of 5-methyl-1-aza-3,7-dioxabicyclo(3.3.0)octane and 450 parts of ethyl ether was slowly added to a solution of propylmagnesium chloride prepared from 100 parts of propyl chloride and 30 parts of magnesium, and 450 parts of ethyl ether. The resulting mixture was refluxed with constant stirring. Sixty parts of water were then added with constant agitation, and the refluxing was continued for one hour. The mixture was then washed with 500 parts of water and the ether layer separated and rectified. The product distilling at 123° C., and 1 mm. pressure, amounted to 110 parts, corresponding to a yield of 82 per cent.

Example II

A solution of 32 parts of 5-methyl-1-aza-3,7-dioxabicyclo(3.3.0)actone and 145 parts of ethyl ether was slowly added to a solution of phenylmagnesium bromide prepared from 91 parts of bromobenzene and 14 parts of magnesium, and 160 parts of ethyl ether. The resulting mixture was refluxed, with constant stirring. The reaction mixture was poured on crushed ice, and allowed to stand for 3 hours. The mixture was heated on a steam bath until all of the ether had evaporated, and the residue was extracted with 650 parts of benzene. The benzene solution was then concentrated to approximately one-fourth of its original volume, by heating on a steam bath, and the residue was cooled. A white crystalline product, melting at 121° C. (uncorrected), amounting to 65 parts, and corresponding to a yield of 71 per cent, was obtained.

Example III

Eight parts of magnesium turnings (Grignard grade) were placed in a suitable three-necked reaction vessel fitted with a reflux condenser, a mercury sealed stirrer, and a dropping funnel. The tops of the condenser and the dropping funnel were protected from carbon dioxide and moisture by means of soda lime and calcium chloride tubes. Five parts of methyl iodide dissolved in 75 parts of ethyl ether were added to the magnesium turnings and the mixture was stirred. After the initial vigorous reaction had subsided, 40 parts of methyl iodide dissolved in 145 parts of ethyl ether, were added to the mixture at such a rate that the mixture refluxed gently. A solution of 52 parts of 3-isobutyl-2-isopropyloxazolidine in 220 parts of ethyl ether was added at a similar rate, and the mixture was allowed to stand for approximately 24 hours. The mixture was stirred, and 20 parts of water were added to the reaction vessel to hydrolyze the Grignard addition product. An additional 130 parts of water were added to the reaction vessel, and the mixture was stirred for approximately 3 hours. The mixture was allowed to settle for 15 or 20 minutes, and the top ether layer was separated from the aqueous layer by decantation. One hundred and fifty parts of fresh ethyl ether were added to the reaction vessel, the mixture was stirred for a short time, and then allowed to separate into two layers. The ether layer was again removed be decantation. The lower aqueous layer was extracted with two additional 200 part portions of ether. The ether solutions were combined and distilled, yielding 54 parts at 104.5–105° C., and 10 mm., corresponding to a yield of 96 per cent.

The above examples are merely illustrative of some of the new chemical compounds and processes for producing the same. Obviously, I do not desire to be limited to the processes or compounds disclosed above as there are several modifications which could be made without departing from the spirit and scope of my invention. I have found the reaction to be very general in character, and one that may be readily effected between the compounds of the type herein disclosed. Some suitable oxazolidines which may be employed in this reaction are 2-isopropyloxazolidine, 2-(1-ethyl-propyl)-4,4-dimethyloxazolidine, 4,4-dimethyl-2-phenyl-oxazolidine, 3-isobutyl-2-isopropyloxazolidine, 4,4-dimethyl-3-(2-ethylbutyl)oxazolidine, 3-isobutyloxazolidine, 3-benzyl-4,4-dimethyloxazolidine, 2-propyl-4-hydroxymethyl-4-methyloxazolidine, 2-furyl-4,4-dimethyloxazolidine, and 2-phenyl-4,4-dimethyloxazolidine.

As specific examples of 1-aza-3,7-dioxabicyclo-(3.3.0)octanes which may be utilized, there may be mentioned: 1-aza-3,7-dioxabicyclo(3.3.0)octane, 5-methyl-1-aza-3,7-dioxabicyclo(3.3.0)octane, 5-ethyl-1-aza-3,7-dioxabicyclo(3.3.0) octane, 5-isopropyl-1-aza-3,7-dioxabicyclo(3.3.0) octane, 5-propyl-1-aza-3,7-dioxabicyclo-(3.3.0)octane, 2,8-dipropyl-5-methyl-1-aza-3,7-dioxabicyclo-(3.3.0)octane, 2,8-dimethyl-5-ethyl-1-aza-3,7-dioxabicyclo(3.3.0)octane, 5-hydroxymethyl-1-aza-3,7-dioxabicyclo(3.3.0)octane, and 2,8-diphenyl-5-methyl-1-aza-3,7-dioxabicyclo(3.3.0)octane.

Any of the Grignard reagent solutions are suitable for this reaction. However, as specific examples there may be mentioned propylmagnesium chloride, phenylmagnesium bromide, isopropylmagnesium chloride, isopropylmagnesium bromide, ethylmagnesium bromide, methylmagnesium iodide, tert-butylmagnesium chloride, and the like.

Now having described my invention, what I claim is:

1. In a process for the preparation of N-substituted amino alcohols, the steps which comprise reacting a Grignard reagent with a member selected from the group consisting of oxazolidines and 1-aza-3,7-dioxabicyclo(3.3.0)octanes, and hydrolyzing the resulting reaction product.

2. In a process for the preparation of N-substituted amino alcohols, the steps which comprise reacting a member selected from the group consisting of oxazolidines and 1-aza-3,7-dioxabicyclo(3.3.0)octanes with a Grignard reagent in the liquid phase, and hydrolyzing the resulting reaction products.

3. In a process for the preparation of N-substituted amino alcohols, the steps which comprise reacting a member selected from the group consisting of oxazolidines and 1-aza-3,7-dioxabicyclo(3.3.0) octanes with a Grignard reagent in the liquid phase, said Grignard reagent being present in substantially molar proportions for each oxygen atom per mole of the said oxazolidines and 1-aza-3,7-dioxabicyclo(3.3.0) octanes, and hydrolyzing the resulting reaction product.

4. N-substituted amino alcohols having the formula

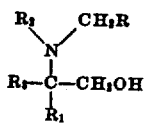

in which R represents a member selected from the group consisting of alkyl and aryl; $R^1$ represents a member selected from the group consisting of hydrogen, alkyl, and hydroxymethyl; $R^2$ is a member of the group consisting of hydrogen, alkyl, and aralkyl; and $R^3$ is a member of the group consisting of hydrogen, alkyl, and hydroxymethyl.

5. 2-methyl-2-dibutylamino-1,3-propanediol.
6. 2-methyl-2-dibenzylamino-1,3-propanediol.
7. N-isobutyl-N-(1-methylisobutyl)-2-amino-1-ethanol.

MURRAY SENKUS.

CERTIFICATE OF CORRECTION.

Patent No. 2,363,465.                                    November 21, 1944.

MURRAY SENKUS.

It is hereby certified that error appears in the printed specification of the above numbered patent requiring correction as follows: Page 1, first column, line 6, for "reactions" read --reaction--; line 13-14, for "folfowing" read --following--; line 38, for that portion of the formula reading "$R_1$=C=CH" read --$R_1$-C-CH--; page 2, first column, line 40, for "actone" read --octane--; and that the said Letters Patent should be read with this correction therein that the same may conform to the record of the case in the Patent Office.

Signed and sealed this 10th day of April, A. D. 1945.

(Seal)                                    Leslie Frazer,
                                    Acting Commissioner of Patents.

stituted amino alcohols, the steps which comprise reacting a member selected from the group consisting of oxazolidines and 1-aza-3,7-dioxabicyclo(3.3.0) octanes with a Grignard reagent in the liquid phase, said Grignard reagent being present in substantially molar proportions for each oxygen atom per mole of the said oxazolidines and 1-aza-3,7-dioxabicyclo(3.3.0) octanes, and hydrolyzing the resulting reaction product.

4. N-substituted amino alcohols having the formula

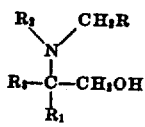

in which R represents a member selected from the group consisting of alkyl and aryl; $R^1$ represents a member selected from the group consisting of hydrogen, alkyl, and hydroxymethyl; $R^2$ is a member of the group consisting of hydrogen, alkyl, and aralkyl; and $R^3$ is a member of the group consisting of hydrogen, alkyl, and hydroxymethyl.

5. 2-methyl-2-dibutylamino-1,3-propanediol.
6. 2-methyl-2-dibenzylamino-1,3-propanediol.
7. N-isobutyl-N-(1-methylisobutyl)-2-amino-1-ethanol.

MURRAY SENKUS.

---

CERTIFICATE OF CORRECTION.

Patent No. 2,363,465.          November 21, 1944.

MURRAY SENKUS.

It is hereby certified that error appears in the printed specification of the above numbered patent requiring correction as follows: Page 1, first column, line 6, for "reactions" read --reaction--; line 13-14, for "folfowing" read --following--; line 38, for that portion of the formula reading "$R_1$=C=CH" read --$R_1$-C-CH--; page 2, first column, line 40, for "actone" read --octane--; and that the said Letters Patent should be read with this correction therein that the same may conform to the record of the case in the Patent Office.

Signed and sealed this 10th day of April, A. D. 1945.

(Seal)                          Leslie Frazer,
                          Acting Commissioner of Patents.